J. A. CORNELL.
Hand-Rubbers.

No. 151,853.    Patented June 9, 1874.

Witnesses
Edwin R. Hill
H. B. Akey

Inventor.
Joseph A. Cornell.

United States Patent Office.

JOSEPH A. CORNELL, OF COLON, MICHIGAN, ASSIGNOR OF ONE-HALF HIS RIGHT TO CHRISTIAN B. HOFFMAN, OF SAME PLACE.

IMPROVEMENT IN HAND-RUBBERS.

Specification forming part of Letters Patent No. 151,853, dated June 9, 1874; application filed September 26, 1873.

*To all whom it may concern:*

Be it known that I, JOSEPH A. CORNELL, of Colon, in the county of St. Joseph and State of Michigan, have invented a new and useful Improvement in Clothes-Rubbers; and do hereby declare the following to be a full, clear, and exact description of the construction and operation of the same, reference being had to the annexed drawings making a part of this specification and to the letters of reference marked thereon, which will enable others skilled in the art to make and use my invention.

My invention relates to a device for rubbing clothes on a common wash-board.

Figure 1:
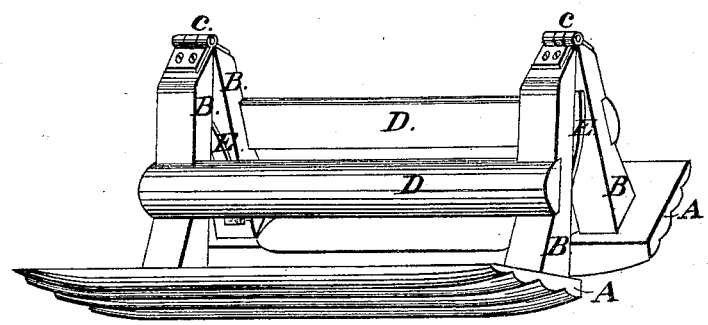
Figure 2:
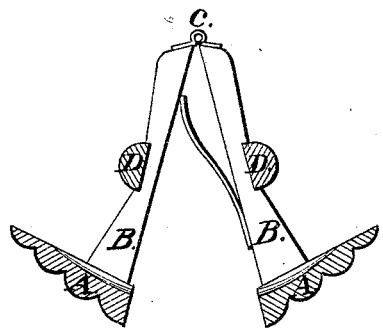

In the drawings, Figure 1 represents a view of a rubber embracing my invention.

Letters A A represent two fluted rubbers, with arms B B B B, which are jointed together at C C. D D represent handles, which are attached to the arms B B B B. Said arms have springs E E between them, which keep the rubbers apart when the hand is relaxed. The rubbers may be made of rubber, wood, or metal.

When using my rubber to wash clothes, I take hold of the handles D D and press the rubbers down on the clothes, which allows enough of the clothes to come up between them, to be griped between them, when the hand is closed, which holds them while rubbing.

The rubber can be placed on any part of the clothes, and operate similar to the hand process.

Having described my invention, its operation and use, what I claim as new, and desire to secure by Letters Patent, is—

In combination with the rubbers A A and arms B B, hinged together at their top, and provided with the handles D D, the springs E E interposed between the said arms, as and for the purpose specified.

JOSEPH A. CORNELL.

Witnesses:
W. B. AKEY,
EDWIN R. HILL.